US011265098B2

(12) United States Patent
Fu et al.

(10) Patent No.: US 11,265,098 B2
(45) Date of Patent: Mar. 1, 2022

(54) DWDM REMOTE PUMPING SYSTEM CAPABLE OF IMPROVING OSNR

(71) Applicant: Accelink Technologies Co., Ltd, Wuhan (CN)

(72) Inventors: Chengpeng Fu, Wuhan (CN); Jintao Tao, Wuhan (CN); Jun Chen, Wuhan (CN); Menghui Le, Wuhan (CN); Chunping Yu, Wuhan (CN)

(73) Assignee: Accelink Technologies Co., Ltd.

( * ) Notice: Subject to any disclaimer, the term of this patent is extended or adjusted under 35 U.S.C. 154(b) by 0 days.

(21) Appl. No.: 17/263,283

(22) PCT Filed: Dec. 25, 2018

(86) PCT No.: PCT/CN2018/123433
§ 371 (c)(1),
(2) Date: Jan. 26, 2021

(87) PCT Pub. No.: WO2020/019659
PCT Pub. Date: Jan. 30, 2020

(65) Prior Publication Data
US 2021/0288744 A1    Sep. 16, 2021

(30) Foreign Application Priority Data

Jul. 27, 2018 (CN) .......................... 201810839921.5

(51) Int. Cl.
*H04J 14/02* (2006.01)
*H04B 10/079* (2013.01)

(52) U.S. Cl.
CPC ...... *H04J 14/0221* (2013.01); *H04J 14/0254* (2013.01); *H04B 10/07953* (2013.01)

(58) Field of Classification Search
None
See application file for complete search history.

(56) References Cited

U.S. PATENT DOCUMENTS 8,548,334 B2    10/2013 Mazed
2001/0012147 A1    8/2001 Lutz et al.
(Continued)

FOREIGN PATENT DOCUMENTS

CN    1296681 A    5/2001
CN    1469180 A    1/2004
(Continued)

OTHER PUBLICATIONS

Inada, "Ultra-Long Span Repeaterless Transmission System Technologies", 2010, NEC Technical Journal vol. 5 No. Jan. 2010, pp. 51-55 (Year: 2010).*

(Continued)

*Primary Examiner* — Darren E Wolf
(74) *Attorney, Agent, or Firm* — Lerner, David, Littenberg, Krumholz & Mentlik, LLP

(57) ABSTRACT

The present disclosure relates to optical communications, and in particular, to a DWDM remote pumping system for improving an OSNR. The system includes remote pumping gain unit, preamplifier, and gain flattening filter sequentially connected. Remote pumping gain unit and preamplifier are cascaded one behind the other as a whole amplifier. Gain flattening filter is disposed at the preamplifier's output end. In the system, remote gain unit and preamplifier which have large impact on the OSNR of the entire system are optimally designed as a whole amplifier. In remote gain unit, gain flattening filter originally disposed between two erbium-doped fiber segments is moved back to preamplifier's output end for significant improvement of gain and noise figures of the remote gain unit while ensuring gain flatness of the entire transmission system, thus effectively improving the entire system's OSNR, improving operation stability and reliability, effectively reducing bit error rate, and facilitating system maintenance.

8 Claims, 4 Drawing Sheets

(56) References Cited

U.S. PATENT DOCUMENTS

| | | | |
|---|---|---|---|
| 2002/0109906 A1* | 8/2002 | Grubb | H04B 10/2935 359/334 |
| 2002/0118934 A1* | 8/2002 | Danziger | H04B 10/2916 385/122 |
| 2003/0030793 A1* | 2/2003 | Bastue | G02B 6/27 356/153 |
| 2003/0035204 A1* | 2/2003 | Ahn | H01S 3/06758 359/341.3 |
| 2004/0114216 A1 | 6/2004 | Huang et al. | |
| 2009/0052015 A1 | 2/2009 | Wang et al. | |
| 2020/0304208 A1* | 9/2020 | Rapp | H04B 10/298 |

FOREIGN PATENT DOCUMENTS

| CN | 1501597 A | 6/2004 |
|---|---|---|
| CN | 101374025 A | 2/2009 |
| CN | 101719796 A | 6/2010 |
| CN | 101997612 A | 3/2011 |
| CN | 103166708 A | 6/2013 |
| CN | 104319611 A | 1/2015 |

OTHER PUBLICATIONS

Syuaib, "Ultra-long span optical transmission using bidirectional Raman amplification", 2015 International Conference on Quality in Research, 978-1-4799-6551-9/15/$31.00 © 2015 IEEE, https://www.researchgate.net/publication/304290410 (Year: 2015).*

International Search Report for PCT/CN2018/123433 dated Apr. 2, 2019; 2 pages.

Search Report for Chinese Application No. 2018108399215 dated Apr. 22, 2019; 2 pages.

Second Search Report for Chinese Application No. 2018108399215 dated Aug. 30, 2019; 2 pages.

Xu, Jian, "Application on ROPA Technology in Ultra-Long Span Optical Transmission System," Chinese Master Theses Full-text Database, No. 1, Jan. 31, 2015 Main body, sections 3.1 and 3.2.

* cited by examiner

DWDM REMOTE PUMPING SYSTEM CAPABLE OF IMPROVING OSNR

CROSS-REFERENCE TO RELATED APPLICATIONS

The present application is a national phase entry under 35 U.S.C § 371 of International Application No. PCT/CN2018/123433 filed Dec. 25, 2018, which claims priority from Chinese Application No. 201810839921.5 filed Jul. 27, 2018, all of which are hereby incorporated herein by reference.

TECHNICAL FIELD OF THE DISCLOSURE

The present disclosure relates to the technical field of optical communications, and in particular, to a DWDM remote pumping system capable of improving an OSNR.

BACKGROUND

As the backbone of smart grid construction, the UHV grid will play an increasingly important role in the power system, and has the characteristics of wide coverage (mostly interconnected power network), long transmission distance and large transmission capacity. However, the line path of the UHV grid passes through remote areas, and the optical relay station is costly constructed and is inconvenient to maintain. Therefore, the optical communication technology of ultra-long distance between stations using remote pumping has become an important technical basis for trans-regional power grid networking. With the rapid development of economy, the rise of urban agglomerations has been promoted, and in the Yangtze River Delta, Pearl River Delta, Bohai Bay and other places, urban agglomerations with adjacent intervals of no more than 350 kilometers have appeared. The demand for bandwidth between adjacent cities in urban agglomerations is currently getting higher and higher, therefore, these areas are becoming a new application hotspot of remote pumping unrepeated transmission. Due to the high cost of construction and maintenance of relay stations in some no-man's land such as swamps, deserts and forests, these areas are also potential application areas for remote pumping unrepeated transmission.

Early power system was mainly single-wavelength long-span system, and such long-span systems did not need to consider the problem of gain flatness when designing remote gain units. However, at present, with the huge demand from big data and video conference for transmission bandwidth, single-wavelength communication system can no longer meet the development need, and the design and construction of multi-wavelength long-span transmission systems is imminent. At present, in the dense wavelength division multiplexing (DWDM) remote pumping systems with multi-wavelength long-span, a remote gain unit and a preamplifier are generally considered as an integrated amplifier, and in order to make the gain of the integrated amplifier as flat as possible, a gain flattening filter (GFF) is usually added in the remote gain unit. Although such setting improves the performance of the integrated amplifier to a certain extent, the remote pumping unit is located at the upstream of the cascade amplifier, and the gain change thereof has a greater influence on the overall noise of the entire amplifier, and the setting of GFF increases the noise index of the remote gain unit, which makes the optical signal noise ratio (OSNR) of the light finally output by the entire transmission system be relatively low and have a certain bit error rate, and makes the robustness of the system be relatively poor. Moreover, the remote gain unit is usually positioned in a place not convenient for construction and the more devices are provided inside, the more inconvenient it is for system maintenance.

Therefore, overcoming the defects existing in the prior art is a problem to be urgently solved in the present technical field.

SUMMARY

The technical problem to be solved in the present disclosure is as follows:

In the current DWDM remote pumping system, the gain flattening filter is usually provided in the remote gain unit, and although the performance of the integrated amplifier is improved to a certain extent, the noise of the integrated amplifier is relatively high, which makes the OSNR of the light finally output by the entire transmission system be relatively low and have bit error, the robustness of the system be relatively poor, and system maintenance be inconvenient.

The present disclosure realizes the above purpose through the following technical solutions.

The present disclosure provides a DWDM remote pumping system capable of improving an OSNR, comprising: a remote pumping gain unit, a preamplifier, and a gain flattening filter connected in sequence, wherein the remote pumping gain unit and the preamplifier are cascaded one behind the other to form a cascade amplifier, and the gain flattening filter is provided at an output end of the preamplifier.

Preferably, the remote pumping gain unit is a foreign fiber pumping gain unit or a same fiber pumping gain unit; and the remote pumping system is a same fiber pumping system or a foreign fiber pumping system, wherein both the same fiber pumping system and the foreign fiber pumping system adopt a way of forward pumping.

Preferably, the DWDM remote pumping system further comprises a pumping unit, and further comprises an optical transmitter array, an optical multiplexer, a power amplifier, a first transmission fiber, a second transmission fiber, an optical demultiplexer and an optical receiver array, which are connected in sequence; wherein the pumping unit is connected to the remote pumping gain unit for providing pumping light to the remote pumping gain unit.

Preferably, a wavelength of the pumping light generated by the pumping unit is 1460-1490 nm.

Preferably, the remote pumping gain unit is a foreign fiber pumping gain unit, and the optical transmitter array, the optical multiplexer, the power amplifier, the first transmission fiber, the remote pumping gain unit, the second transmission fiber, the preamplifier, the gain flattening filter, the optical demultiplexer and the optical receiver array are connected in sequence; wherein the remote pumping system further comprises a third transmission fiber which is separately set, and the pumping unit transmits the pumping light to the remote pumping gain unit through the third transmission fiber.

Preferably, the remote pumping gain unit includes a signal input end optical isolator, a signal/pumping multiplexer, a first erbium-doped fiber, an intermediate optical isolator, a second erbium-doped fiber, a pumping mirror, and a signal output end optical isolator, which are connected in sequence; wherein signal light enters the remote pumping gain unit through the signal input end optical isolator, and is output through the signal output end optical isolator after being amplified; and the pumping light directly enters the remote pumping gain unit through the third transmission fiber to realize forward pumping, then the pumping light and the signal light are couples, through the signal/pumping multiplexer, into the erbium-doped fiber to be amplified, finally, remaining pumping light is reflected by the pumping mirror back to an original line.

Preferably, the remote pumping gain unit is a same fiber pumping gain unit, and the optical transmitter array, the optical multiplexer, the power amplifier, the first transmission fiber, the remote pumping gain unit, the second transmission fiber, the pumping unit, the preamplifier, the gain flattening filter, the optical demultiplexer and the optical receiver array are connected in sequence; wherein the pumping unit reversely transmits the pumping light to the remote pumping gain unit through the second transmission fiber.

Preferably, the remote pumping gain unit includes a signal input end optical isolator, a signal/pumping multiplexer, a first erbium-doped fiber, an intermediate optical isolator, a second erbium-doped fiber, a pumping mirror, a signal output end optical isolator, and a pumping/signal multiplexer, which are connected in sequence;

wherein signal light enters the remote pumping gain unit through the signal input end optical isolator, and is output through the signal output end optical isolator after being amplified; and the pumping light is separated by the pumping/signal multiplexer, then separated pumping light and the signal light are coupled into the erbium-doped fiber by the signal/pumping multiplexer, finally remaining pumping light is reflected back to an original line by the pumping mirror.

Preferably, an adjustable optical attenuator is further provided between the first erbium-doped fiber and the second erbium-doped fiber, and power gain provided by the first erbium-doped fiber is greater than insertion loss of the adjustable optical attenuator.

Preferably, the preamplifier adopts an erbium-doped fiber amplifier or a Raman amplifier.

Compared with the prior art, the beneficial effects of the embodiments of the present disclosure are as follows:

The embodiment of the present disclosure provides a DWDM remote pumping system capable of improving an OSNR, wherein the remote gain unit and the preamplifier which have a relatively large influence on the OSNR of the entire transmission system are optimally designed as an integrated amplifier, and in the remote gain unit, the gain flattening filter originally provided in the middle of two erbium-doped fiber segments is moved backward to the output end of the preamplifier, so that the gain and noise index of the remote gain unit are significantly improved while ensuring the gain flatness of the entire transmission system, thus the OSNR of the entire system is effectively improved, the bit error rate is reduced, and the system maintenance is facilitated; meanwhile, compared with the remote gain unit, the preamplifier is easier to be constructed, and further the system maintenance is facilitated after the GFF is placed on the output end of the preamplifier which is easier to be constructed.

BRIEF DESCRIPTION OF THE DRAWINGS

In order to more clearly explain the technical solutions of embodiments of the present disclosure, the following will briefly introduce the drawings that need to be used in the embodiments of the present disclosure. Obviously, the drawings in the following description are only some embodiments of the present disclosure, and for those ordinary skills in the art, other drawings can be obtained based on these drawings without inventive labor.

DETAILED DESCRIPTION

In order to make the objects, technical solutions and advantages of the present disclosure more obvious, the present disclosure is further described in detail below with reference to the accompanying drawings and embodiments. It shall be noted that the specific embodiments described herein are only for explaining but not for limiting the present disclosure.

In addition, the technical features involved in various embodiments of the present disclosure described below may be combined with each other as long as they do not conflict with each other. Hereinafter, the present disclosure will be described in detail with reference to the accompanying drawings and embodiments.

Embodiment 1

Figure 1:
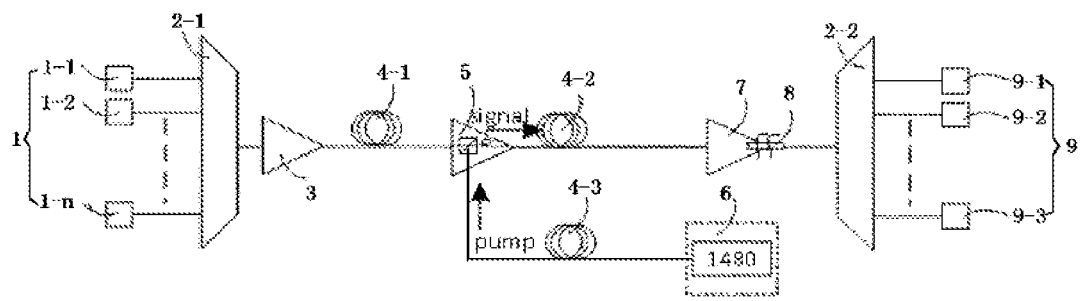
FIG. 1 is a schematic structural diagram of a DWDM remote pumping system (foreign fiber pumping) capable of improving an OSNR provided by an embodiment of the present disclosure.

An embodiment of the present disclosure provides a DWDM remote pumping system capable of improving an OSNR, as shown in FIG. 1, comprising a remote pumping gain unit 5, a preamplifier 7, and a gain flattening filter 8, which are connected in sequence. The remote pumping gain unit 5 and the preamplifier 7 form a cascade amplifier, that is to say, the remote pumping gain unit 5 and the preamplifier 7 are considered as an integrated amplifier. The gain flattening filter 8 is located at the downstream of the integrated amplifier, and is specifically provided at an output end of the preamplifier 7.

Referring to FIG. 1 specifically, in the embodiment of the present disclosure, the remote pumping gain unit 5 is a foreign fiber pumping gain unit, correspondingly, the remote pumping system is a foreign fiber pumping system, and a way of forward pumping is used so as to obtain better noise performance. A complete remote pumping system comprises an optical transmitter array 1, an optical multiplexer 2-1, a power amplifier 3, a first transmission fiber 4-1, a remote pumping gain unit 5, a second transmission fiber 4-2, a preamplifier 7, a gain flattening filter 8, an optical demultiplexer 2-2 and an optical receiver array 9, which are connected in sequence. The optical transmitter array 1 includes a first optical transmitter 1-1, a second optical transmitter 1-2 . . . an nth optical transmitter 1-$n$, where n is a natural number. The optical receiver array 9 includes a first optical receiver 9-1, a second optical receiver 9-2 . . . an n-th optical receiver 9-$n$, where n is a natural number. The remote pumping system further comprises a pumping unit 6 and a third transmission fiber 4-3 which are separately provided. The pumping unit 6 is used to provide pumping light to the remote pumping gain unit 5, and the third transmission fiber 4-3 is used to connect the pumping unit 6 with the remote pumping gain unit 5, thus, the pumping unit 6 transmits pumping light to the remote pumping gain unit 5 through the third transmission fiber 4-3. The most commonly used wavelengths of pumping light are 1480 nm and 980 nm, and in the embodiment of the present disclosure, the wavelength of the pumping light generated by the pumping unit 6 is 1460-1490 nm. However, the 980 nm pumping light is multimode in the transmission fiber, and its transmission loss is very large, so it is not suitable to be used in remote pumping.

In the remote pumping system as shown in FIG. 1, signal light is sent by each transmitter in the optical transmitter array 1, and is multiplexed by the optical multiplexer 2-1, then is amplified by the power amplifier 3 in power, and then is transmitted through the first transmission fiber 4-1 to the remote pumping gain unit 5; meanwhile, pumping light is generated by the pumping unit 6, and is transmitted through the third transmission fiber 4-3 to the remote pumping gain unit 5; the signal light is amplified in the remote pumping gain unit 5 by means of the pumping light, and reaches the preamplifier 7 after being transmitted through the second transmission fiber 4-2, then after further amplified, reaches the gain flattening filter 8, and then after filtered and flattened the gain spectrum flattened by filtering action, the signal light after gain flattened is demultiplexed by the optical demultiplexer 2-2, and finally received by each optical receiver in the optical receiver array 9.

Figure 2:
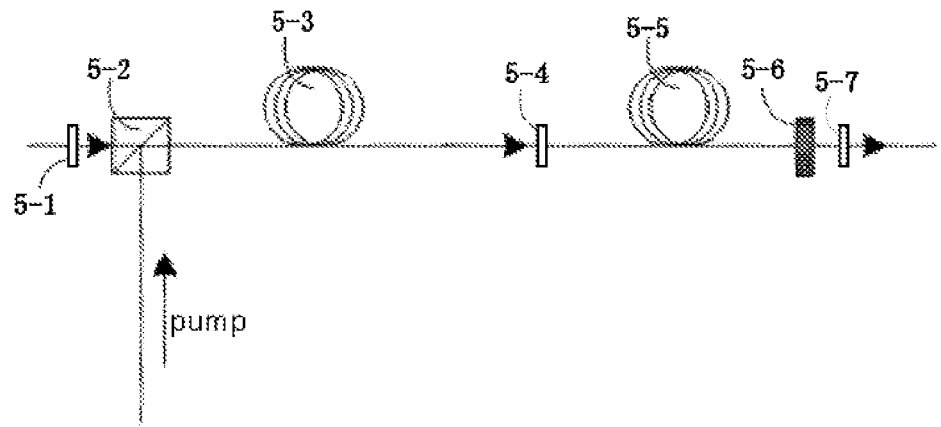
FIG. 2 is a schematic structural diagram of the remote pumping gain unit in the DWDM remote pumping system (foreign fiber pumping) shown in FIG. 2.

Referring to FIG. 2, the remote pumping gain unit 5 is a foreign fiber pumping gain unit, and specifically includes a signal input end optical isolator 5-1, a signal/pumping multiplexer 5-2, a first erbium-doped fiber 5-3, an intermediate optical isolator 5-4, a second erbium-doped fiber 5-5, a pumping mirror 5-6, and a signal output end optical isolator 5-7, which are connected in sequence. The signal input end optical isolator 5-1, the intermediate optical isolator 5-4, and the signal output end optical isolator 5-7 are all used to pass signal light in one direction. The signal light enters the remote pumping gain unit 5 through the signal input end optical isolator 5-1, and reaches the signal/pumping multiplexer 5-2. In foreign fiber pumping, the transmission direction of the pumping light and the signal light are the same, then the pumping light directly enters the remote pumping gain unit 5 through the third transmission fiber 4-3, and reaches the signal/pumping multiplexer 5-2, then is coupled with the signal light by the signal/pumping multiplexer 5-2 into the erbium-doped fiber to amplify the signal light in order to realize the forward pumping, and reduce the noise index. The amplified signal light passes through the first erbium-doped fiber 5-3 and the second erbium-doped fiber 5-5 successively, and is output through the signal output end optical isolator 5-7. The pumping light passes through the first erbium-doped fiber 5-3 and the second erbium-doped fiber 5-5 successively, and the remaining pumping light is finally reflected back to an original line by the pumping mirror 5-6.

The embodiment of the present disclosure provides a DWDM remote pumping system improvable an OSNR, and the remote pumping system is a foreign fiber pumping system, wherein the remote pumping gain unit and the preamplifier having a relatively large influence on the OSNR of the entire transmission system are considered as an integrated amplifier to be optimally designed, and in the remote pumping gain unit, the gain flattening filter originally provided in the middle of two erbium-doped fiber segments is moved backward to the output end of the preamplifier, so that the gain and noise index of the remote gain unit are significantly improved while ensuring the gain flatness of the entire transmission system, thereby effectively improving the OSNR of the entire system, reducing the bit error rate, and facilitating system maintenance; meanwhile, compared with the remote gain unit, the preamplifier is easier to be constructed, and the system maintenance is facilitated after the GFF is placed at the output end of the preamplifier which is easier to be constructed.

Figure 3:
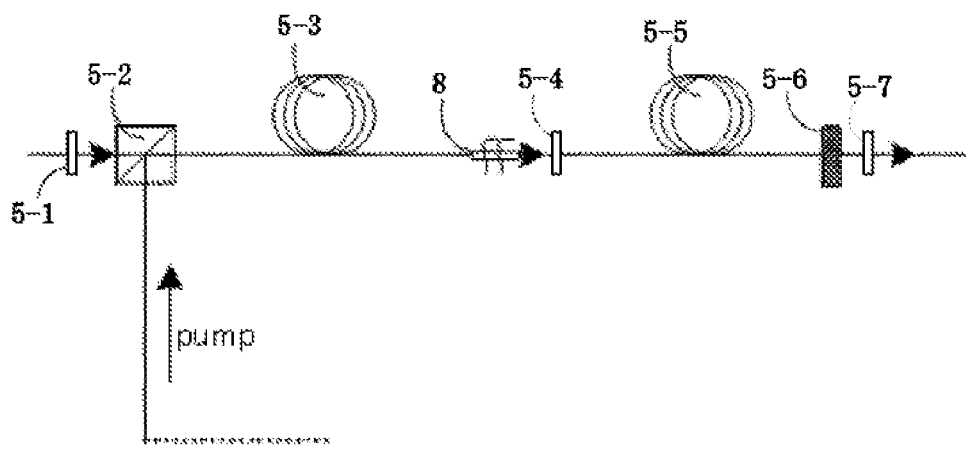
FIG. 3 is a schematic structural diagram of a remote pumping gain unit (foreign fiber pumping) in a traditional DWDM remote pumping system.

In the remote gain unit, the erbium-doped fiber is usually divided into two segments to realize a larger gain and a lower noise index, because the noise index of the amplifier made of a single segment of erbium-doped fiber is seriously deteriorated when the output power thereof is close to its saturation output power. In a traditional DWDM remote pumping gain unit, in order to achieve flat gain, a gain flattening filter is added between two segments of erbium-doped fiber. Referring to FIG. 3, the traditional DWDM remote pumping gain unit includes a signal input end isolator 5-1, a signal/pumping multiplexer 5-2, a first erbium-doped fiber 5-3, a gain flattening filter 8, an intermediate optical isolator 5-4, a second erbium-doped fiber 5-5, a pumping mirror 5-6, and a signal output end optical isolator 5-7, which are connected in sequence, and the pumping unit is directly connected to the signal/pumping multiplexer 5-2 through a single transmission fiber. After a gain flattening filter is added between the two segments of erbium-doped fibers, there will be two options for the path of pumping light: one is to add a few more devices in the middle of the line to make the pumping light pass through a branch after bypassing the gain flattening filter 8; the other is to make the pumping light pass through the gain flattening filter 8 directly. Although the gain flattening filter can ensure the gain of the entire transmission system to be flat, however, no matter which option it selects, it will increase the loss of signal light and of pumping light, and bring the gain reduction and noise index deterioration to the entire remote pumping gain unit.

Figure 4:
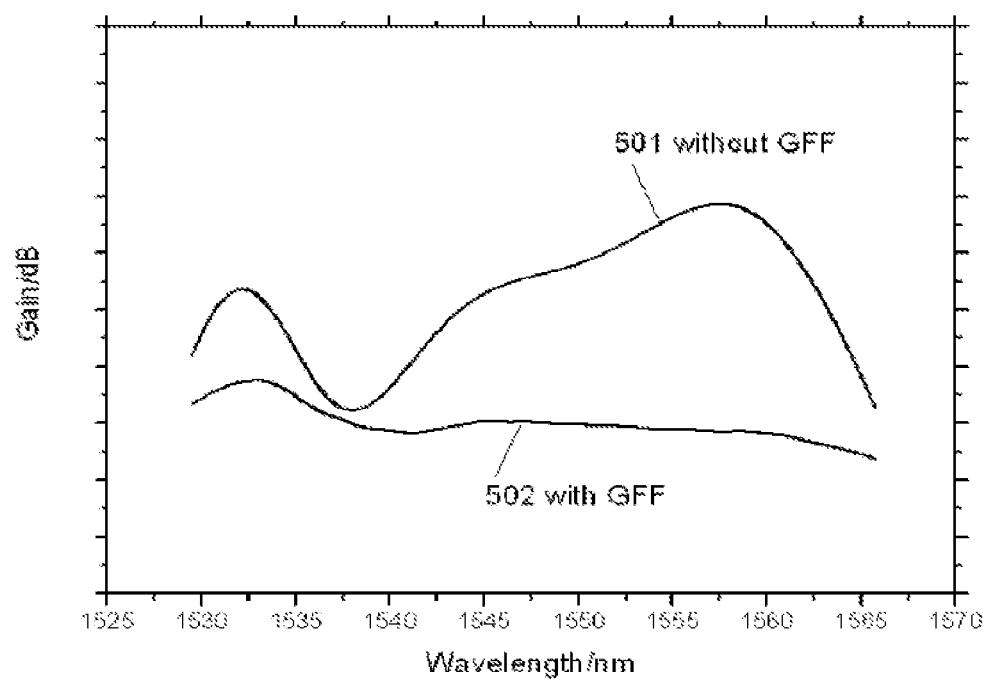
FIG. 4 is a gain spectrogram of a remote pumping gain unit with or without a gain flattening filter when the pumping power is the same.
Figure 5:
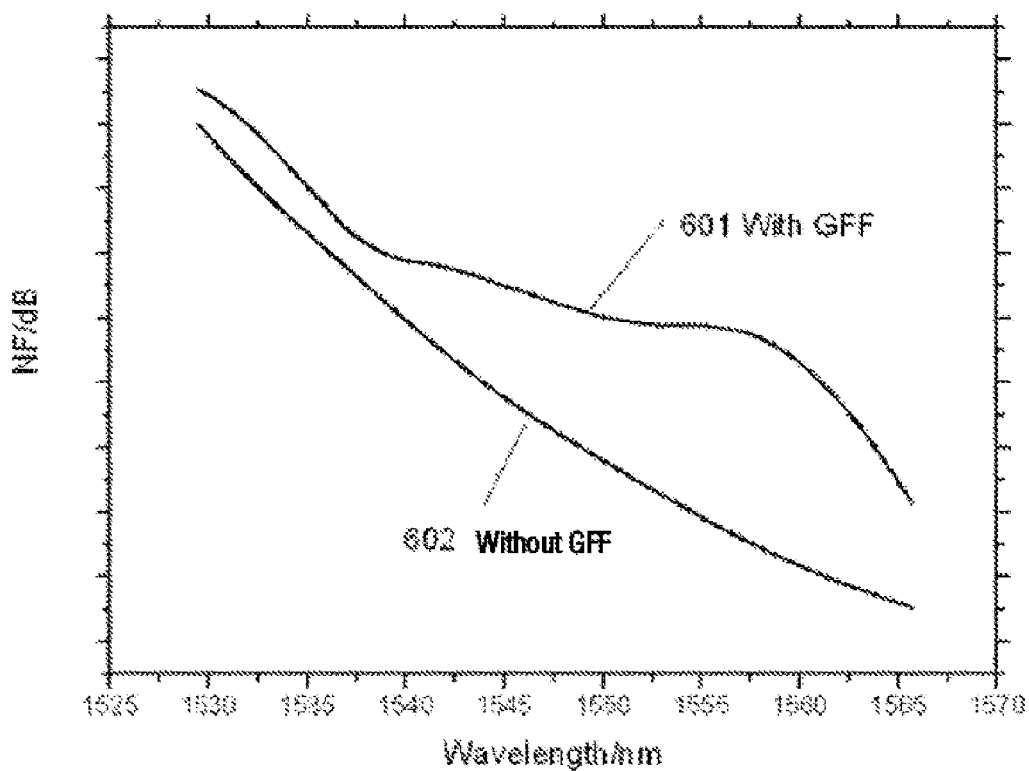
FIG. 5 is a noise spectrogram of a remote pumping gain unit with or without gain flattening filter when the pumping power is the same.

Referring to FIG. 4, curve 501 represents a gain spectrum of the remote pumping gain unit without a gain flattening filter between two segments of erbium-doped fibers, and curve 502 represents a gain spectrum of the remote pumping gain unit with a GFF between two segments of erbium-doped fibers. It can be seen from FIG. 4 that although the gain spectrum tends to be flat after GFF is added, the gain is significantly reduced. Further referring to FIG. 5, curve 601 represents a noise index spectrum of the remote pumping gain unit when GFF is provided between two segments of erbium-doped fibers, and curve 602 represents the noise index spectrum of the remote pumping gain unit when there is no GFF between two segments of erbium-doped fibers;

thus it can be seen from the figure that the noise index of the remote pumping gain unit increases significantly after adding GFF.

In the embodiment of the present disclosure, referring to FIG. 1, after the remote pumping gain unit 5 is considered to be cascaded with the preamplifier 7 as an integrated amplifier, the remote pumping gain unit 5 is located at the upstream of the cascade amplifier, and the gain change thereof has a greater influence on the overall noise of the entire amplifier, which has a greater influence on the OSNR of the entire transmission system, therefore, the gain flattening filter originally provided in the middle of two segments of erbium-doped fiber is moved backward to the output end of the preamplifier 7. In this way, in the case of the same pumping power, the gain of the remote pumping gain unit 5 can be greatly improved, and the noise index thereof can be reduced, thus ensuring high gain and low noise of the entire amplifier, at the same time, the gain of the entire transmission system can be continuously ensured to be flat without increasing the loss of transmission lines, which makes the DWDM remote pumping system be in the best working condition, obtain the best OSNR, improve the stability and reliability of the system, and reduce the bit error rate.

The principle is as follows: for the cascade amplifier, a calculation formula of an equivalent noise index NF is $NF=NF1+(NF2-1)/G1$; where NF1 is the noise index of the remote pumping gain unit 5, G1 is the gain of the remote pumping gain unit 5, and NF2 is the noise index of the preamplifier 7. In order to reduce the overall noise index NF, it is necessary to increase G1 and reduce NF1 as much as possible. After the gain flattening filter is moved backward to the output end of the preamplifier 7, the remote pumping gain unit 5 is no longer provided with a gain flattening filter, so that the insertion loss caused by the pumping light and signal light when passing through the gain flattening filter is reduced. Therefore the gain G1 of the remote pumping gain unit 5 is improved, at the same time, the NF1 is reduced. In this way, the overall noise index NF will be significantly reduced, thereby improving the OSNR of the entire DWDM remote pumping system, and the entire amplifier is optimized. If the output power of the preamplifier 7 decreases, it can be compensated by increasing the pumping power of the preamplifier 7, so that the gain of the entire transmission system keeps unchanged.

Figure 6:
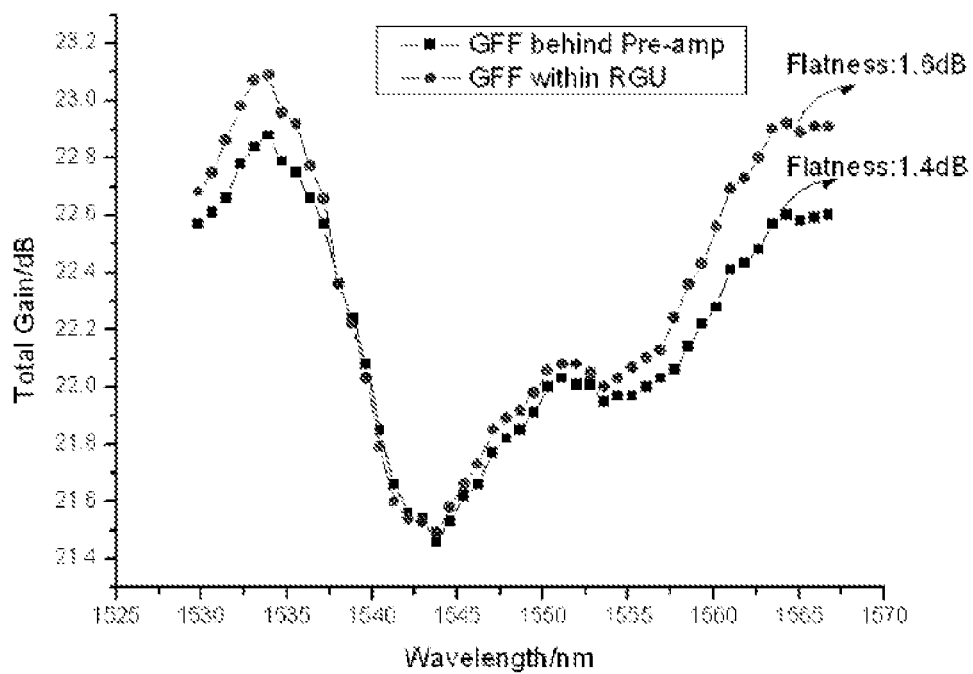
FIG. 6 is a gain spectrum comparison diagram of the overall output of the DWDM remote pumping system shown in FIG. 1 and a traditional DWDM remote pumping system.
Figure 7:
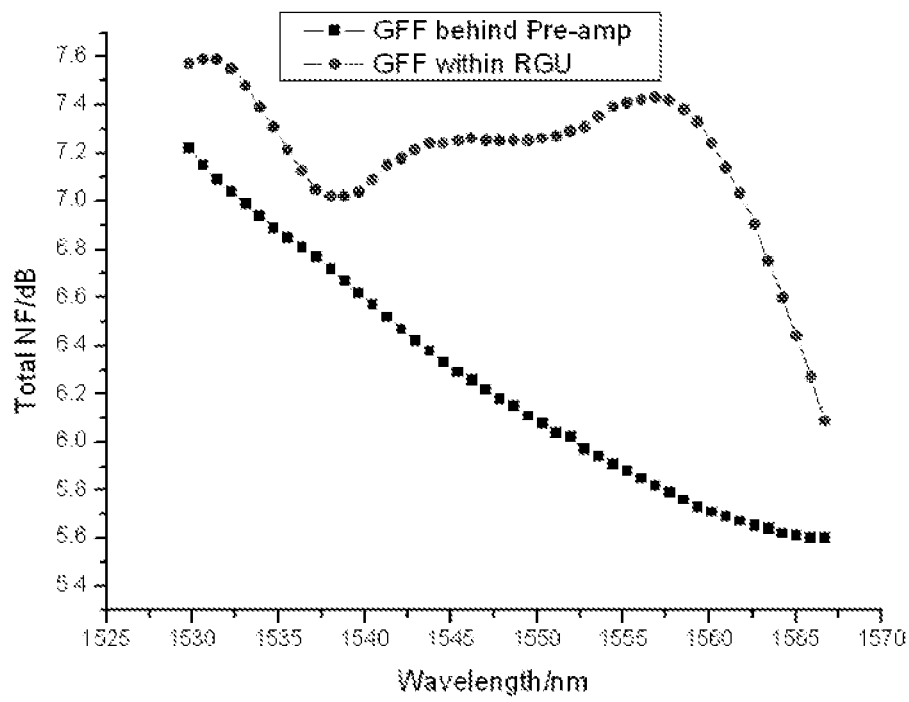
FIG. 7 is a noise spectrum comparison diagram of the overall output of the DWDM remote pumping system shown in FIG. 1 and a traditional DWDM remote pumping system.

For the two cases where GFF is provided in the remote pumping gain unit and GFF is moved backward to the output end of the preamplifier, the comparison of the gain spectrum and the comparison of the noise spectrum of the entire transmission system are shown in FIG. 6 and FIG. 7, where RGU in the figures represents the remote pumping gain unit, Pre-amp represents the preamplifier, and Flatness represents the flatness, i.e. the degree of flatness. As shown in FIG. 6, in the case of the two settings of GFF, the gain of the entire transmission system can keep substantially unchanged: especially, between the wavelength of 1540-1550 nm, the gain is almost unchanged, while in other wavelengths, the difference between the gains of the two curves is only about 0.3 dB at most; for the two cases, the gain flatness of the gain spectrum is 1.6 dB and 1.4 dB, and are substantially unchanged. Therefore, it can be considered that after the GFF is moved backward, there is substantially no effect on the overall gain and gain flatness of the system. As shown in FIG. 7, the overall noise index of the system is obviously reduced. Combining FIG. 6 and FIG. 7, the backward movement of GFF reduces the overall noise index of the entire transmission system, while the overall gain is substantially unchanged, and the output optical power is substantially unchanged, therefore, the OSNR of the entire system can be effectively improved.

In combination with the embodiment of the present disclosure, there is also a preferred implementation scheme, in which in the remote pumping gain unit 5, an adjustable optical attenuator is further provided between the first erbium-doped fiber 5-3 and the second erbium-doped fiber 5-5, and the power gain provided by the first erbium-doped fiber 5-3 is greater than the insertion loss of the adjustable optical attenuator. By changing the attenuation of the adjustable optical attenuator, the gain of the remote pumping gain unit 5 can be adjusted, thereby controlling the external gain of the entire amplifier to meet different requirements for gain. The adjustable optical attenuator may be an electronically controlled adjustable optical attenuator or a mechanical adjustable optical attenuator.

Embodiment 2

On the basis of the above embodiment 1, the embodiment of the present disclosure also provides another DWDM remote pumping system capable of improving an OSNR, and the difference from Embodiment 1 is that the remote pumping gain unit is a same fiber pumping gain unit, correspondingly, the remote pumping system is a same fiber pumping system; the remote pumping gain unit and the preamplifier are also considered as an integrated amplifier, and the gain flattening filter is moved backward to the output end of the preamplifier.

Figure 8:
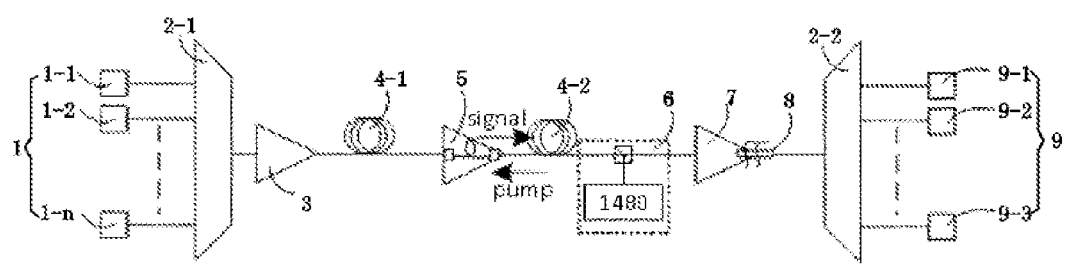
FIG. 8 is a schematic structural diagram of another DWDM remote pumping system (a same fiber pumping) capable of improving an OSNR provided by an embodiment of the present disclosure.

Referring to FIG. 8 specifically, in the embodiment of the present disclosure, a complete remote pumping system includes an optical transmitter array 1, an optical multiplexer 2-1, a power amplifier 3, a first transmission fiber 4-1, a remote pumping gain unit 5, a second transmission fiber 4-2, a pumping unit 6, a preamplifier 7, a gain flattening filter 8, an optical demultiplexer 2-2 and an optical receiver array 9, which are connected in sequence. The optical transmitter array 1 includes a first optical transmitter 1-1, a second optical transmitter 1-2 . . . an nth optical transmitter 1-n, where n is a natural number. The optical receiver array 9 includes a first optical receiver 9-1, a second optical receiver 9-2 . . . an n-th optical receiver 9-n, where n is a natural number. The power amplifier 3 can use an erbium-doped fiber amplifier or a Raman fiber amplifier, and the preamplifier 7 can be an erbium-doped fiber amplifier or a Raman fiber amplifier. The pumping unit 6 can use a 1480 pumping laser to generate pumping light with a wavelength of about 1480 nm. The reason to use a 1480 pumping laser is that the 980 nm pumping light is multimode in the transmission fiber, and the transmission loss thereof is very large, so it is not suitable to be used in remote pumping.

In the remote pumping system as shown in FIG. 8, signal light is sent by each transmitter in the optical transmitter array 1, and is multiplexed by the optical multiplexer 2-1 and is amplified by the power amplifier 3 in power, and then is transmitted through the first transmission fiber 4-1 to the remote pumping gain unit 5. Meanwhile, pumping light is generated by the pumping unit 6, and is reversely transmitted through the second section of transmission fiber 4-2 to the remote pumping gain unit 5. The signal light is amplified by means of the pumping light in the remote pumping gain unit 5, then is transmitted through the second transmission fiber 4-2 to the preamplifier 7, and after further amplified, reaches the gain flattening filter 8 to be filtered and flatten the gain spectrum by filtering action, and then the signal light after gain flattened is demultiplexed by the optical demultiplexer 2-2, and finally received by each optical receiver in the optical receiver array 9.

Figure 9:
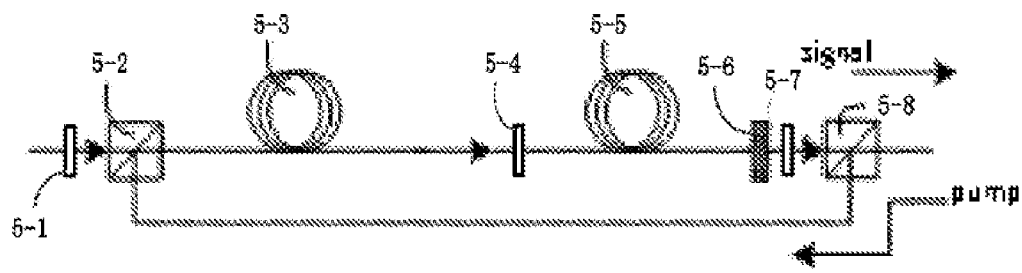
FIG. 9 is a schematic structural diagram of the remote pumping gain unit in the DWDM remote pumping system (a same fiber pumping) shown in FIG. 8.

Referring to FIG. 9, the remote pumping gain unit 5 is a same-fiber pumping gain unit, and specifically includes a signal input end optical isolator 5-1, a signal/pumping multiplexer 5-2, a first erbium-doped fiber 5-3, an intermediate optical isolator 5-4, a second erbium-doped fiber 5-5, a pumping mirror 5-6, a signal output end optical isolator 5-7, and a pumping/signal multiplexer 5-8, which are connected in sequence. The signal light enters the remote pumping gain unit 5 through the signal input end optical isolator 5-1, and reaches the signal/pumping multiplexer 5-2. In the same fiber backward pumping, the transmission direction of the pumping light and the signal light are opposite, then before entering the remote pumping gain unit 5, the pumping light is separated by the pumping/signal multiplexer 5-8, and is coupled with the signal light into the erbium-doped fiber by the signal/pumping multiplexer 5-2 to realize the forward pumping and reduce the noise index. After passing through the first erbium-doped fiber 5-3 and the second erbium-doped fiber 5-5 successively, the amplified signal light is output through the signal output end optical isolator 5-7. After the pumping light passes through the first erbium-doped fiber 5-3 and the second erbium-doped fiber 5-5 successively, the remaining pumping light is finally reflected back to an original line by the pumping mirror 5-6.

The specific principle analysis that the OSNR of the entire system can be improved after the gain flattener is moved backward can refer to the Embodiment 1, which will not be repeated here.

The embodiment of the present disclosure provides a DWDM remote pumping system improvable an OSNR, and the remote pumping system is a same fiber pumping system, wherein the remote pumping gain unit and the preamplifier which have a relatively large influence on the OSNR of the entire transmission system are considered as an integrated amplifier to be optimally designed, and in the remote pumping gain unit, the gain flattening filter originally provided in the middle of two erbium-doped fiber segments is moved backward to the output end of the preamplifier, so that the gain and the noise index of the remote gain unit are significantly improved while ensuring the gain flatness of the entire transmission system, thereby effectively improving the OSNR of the entire system, reducing bit error rate, and facilitating system maintenance; meanwhile, compared with the remote gain unit, the preamplifier is easier to be constructed, and the system maintenance is facilitated after the GFF is provided on the output end of the preamplifier which is easier to be constructed.

The above description is only the preferred embodiments of the present disclosure and is not intended to limit the present disclosure. Any modification, equivalent replacement, and improvement made within the spirit and principle of the present disclosure shall be included in the protection of the present disclosure.

What is claimed is:

1. A DWDM remote pumping system capable of improving an OSNR, wherein the DWDM remote pumping system comprises a remote pumping gain unit, a preamplifier, and a gain flattening filter connected in sequence, the remote pumping gain unit and the preamplifier are cascaded to form a cascade amplifier, and the gain flattening filter is provided at an output end of the preamplifier, wherein the DWDM remote pumping system further comprises a pumping unit, and an optical transmitter array, an optical multiplexer, a power amplifier, a first transmission fiber, a second transmission fiber, an optical demultiplexer and an optical receiver array, which are connected in sequence; wherein the pumping unit is connected to the remote pumping gain unit for providing pumping light to the remote pumping gain unit, wherein the remote pumping gain unit is a foreign fiber pumping gain unit, and the optical transmitter array, the optical multiplexer, the power amplifier, the first transmission fiber, the remote pumping gain unit, the second transmission fiber, the preamplifier, the gain flattening filter, the optical demultiplexer and the optical receiver array are connected in sequence; wherein the remote pumping system further comprises a third transmission fiber which is separately provided, and the pumping unit transmits the pumping light to the remote pumping gain unit through the third transmission fiber, wherein the remote pumping gain unit includes a signal input end optical isolator, a signal/pumping multiplexer, a first erbium-doped fiber, an intermediate optical isolator, a second erbium-doped fiber, a pumping mirror, and a signal output end optical isolator, which are connected in sequence; and wherein signal light enters the remote pumping gain unit through the signal input end optical isolator, and is output through the signal output end optical isolator after being amplified; the pumping light directly enters the remote pumping gain unit through the third transmission fiber to realize forward pumping, then the pumping light and the signal light are coupled, by the signal/pumping multiplexer, into the erbium-doped fiber to be amplified, finally, remaining pumping light is reflected by the pump mirror back to an original line.

2. The DWDM remote pumping system capable of improving an OSNR of claim 1, wherein
the remote pumping system is a same fiber pumping system or a foreign fiber pumping system, and the same fiber pumping system and the foreign fiber pumping system both use a way of forward pumping.

3. The DWDM remote pumping system capable of improving an OSNR of claim 1, wherein a wavelength of the pumping light generated by the pumping unit is 1460-1490 nm.

4. The DWDM remote pumping system capable of improving an OSNR of claim 1, wherein the remote pumping gain unit is a same fiber pumping gain unit, and
the optical transmitter array, the optical multiplexer, the power amplifier, the first transmission fiber, the remote pumping gain unit, the second transmission fiber, the pumping unit, the preamplifier, the gain flattening filter, the optical demultiplexer and the optical receiver array are connected in sequence;

wherein the pumping unit reversely transmits the pumping light to the remote pumping gain unit through the second transmission fiber.

5. The DWDM remote pumping system capable of improving an OSNR of claim 4, wherein the remote pumping gain unit includes a signal input end optical isolator, a signal/pumping multiplexer, a first erbium-doped fiber, an intermediate optical isolator, a second erbium-doped fiber, a pumping mirror, a signal output end optical isolator, and a pumping/signal multiplexer, which are connected in sequence;

wherein signal light enters the remote pumping gain unit through the signal input end optical isolator, and is output through the signal output end optical isolator after being amplified; and the pumping light is separated by the pumping/signal multiplexer, then the signal/pumping multiplexer couples separated pumping light and the signal light into the erbium-doped fiber, finally remaining pumping light is reflected back to an original line by the pumping mirror.

6. The DWDM remote pumping system capable of improving an OSNR of claim 1, wherein an adjustable optical attenuator is further provided between the first erbium-doped fiber and the second erbium-doped fiber, and power gain provided by the first erbium-doped fiber is greater than insertion loss of the adjustable optical attenuator.

7. The DWDM remote pumping system capable of improving an OSNR of claim 1, wherein the preamplifier adopts an erbium-doped fiber amplifier or a Raman amplifier.

8. The DWDM remote pumping system capable of improving an OSNR of claim 5, wherein an adjustable optical attenuator is further provided between the first erbium-doped fiber and the second erbium-doped fiber, and power gain provided by the first erbium-doped fiber is greater than insertion loss of the adjustable optical attenuator.

* * * * *